US009794307B2

United States Patent
Allen et al.

(10) Patent No.: US 9,794,307 B2
(45) Date of Patent: Oct. 17, 2017

(54) APPARATUS, AND ASSOCIATED METHOD, FOR NOTIFYING, DELIVERING, AND DELETING MEDIA BURSTS COMMUNICATED IN A PUSH-TO-TALK OVER CELLULAR COMMUNICATION SYSTEM

(75) Inventors: Andrew Allen, Mundelein, IL (US); Bokinakere Subbarao Sundresh, Basingstoke (GB)

(73) Assignee: BlackBerry Limited, Waterloo, Ontario (CA)

( * ) Notice: Subject to any disclaimer, the term of this patent is extended or adjusted under 35 U.S.C. 154(b) by 1354 days.

(21) Appl. No.: 11/670,581

(22) Filed: Feb. 2, 2007

(65) Prior Publication Data

US 2007/0184868 A1 Aug. 9, 2007

Related U.S. Application Data

(60) Provisional application No. 60/765,097, filed on Feb. 3, 2006.

(51) Int. Cl.
*H04R 7/00* (2006.01)
*H04L 29/06* (2006.01)
*H04W 4/10* (2009.01)
*H04W 76/00* (2009.01)
*H04W 80/10* (2009.01)

(52) U.S. Cl.
CPC ........... *H04L 65/4061* (2013.01); *H04W 4/10* (2013.01); *H04W 76/005* (2013.01); *H04L 65/1016* (2013.01); *H04W 80/10* (2013.01)

(58) Field of Classification Search
CPC ................................ H04W 4/12; H04W 68/00
See application file for complete search history.

(56) References Cited

U.S. PATENT DOCUMENTS

| | | | | |
|---|---|---|---|---|
| 5,848,143 | A * | 12/1998 | Andrews et al. | 379/265.09 |
| 7,917,586 | B2 * | 3/2011 | Kim | 709/206 |
| 2003/0120813 | A1* | 6/2003 | Majumdar et al. | 709/247 |
| 2004/0111481 | A1* | 6/2004 | Kim | 709/206 |
| 2004/0151158 | A1* | 8/2004 | Gannage et al. | 370/351 |
| 2004/0151192 | A1* | 8/2004 | Trossen | 370/401 |

(Continued)

FOREIGN PATENT DOCUMENTS

| CN | 1658689 | 8/2005 |
|---|---|---|
| WO | 2004/075581 | 9/2004 |

OTHER PUBLICATIONS

J. Rosenberg, Network Working Group, 2002, the Internet Society, RFC 3261, pp. 11-12.*

(Continued)

*Primary Examiner* — Ayodeji Ayotunde
(74) *Attorney, Agent, or Firm* — Fish & Richardson P.C.

(57) ABSTRACT

Apparatus, and an associated method, for a PoC (Push-to-Talk over Cellular)-capable communication system. A user equipment PoC box is provided, and a corresponding network PoC box is also provided. A transport mechanism is defined and provided by which to communicate a PoC media burst that is delivered to a PoC box and stored thereat. Control functionality is provided by which to control disposition of the media burst, such as to make notification of a delivered media burst or to dispose of the media burst when no longer needed, is further provided.

9 Claims, 4 Drawing Sheets

(56) References Cited

U.S. PATENT DOCUMENTS

| | | | |
|---|---|---|---|
| 2004/0192363 A1* | 9/2004 | Rosetti et al. | 455/509 |
| 2005/0009542 A1* | 1/2005 | Oprescu-Surcobe et al. | 455/466 |
| 2005/0058260 A1 | 3/2005 | Lasensky et al. | |
| 2005/0096029 A1* | 5/2005 | Pelaez et al. | 455/419 |
| 2005/0105511 A1 | 5/2005 | Poikselka | |
| 2005/0141511 A1* | 6/2005 | Gopal | 370/395.2 |
| 2005/0207379 A1* | 9/2005 | Shen et al. | 370/338 |
| 2005/0215273 A1* | 9/2005 | Ito | 455/518 |
| 2005/0232267 A1* | 10/2005 | Mostafa | 370/389 |
| 2005/0245240 A1* | 11/2005 | Balasuriya et al. | 455/414.1 |
| 2005/0250476 A1 | 11/2005 | Worger et al. | |
| 2006/0019692 A1* | 1/2006 | Huh et al. | 455/518 |
| 2006/0031368 A1* | 2/2006 | deCone | 709/207 |
| 2006/0046757 A1* | 3/2006 | Hoover et al. | 455/518 |
| 2006/0046758 A1* | 3/2006 | Emami-Nouri et al. | 455/518 |
| 2006/0120308 A1* | 6/2006 | Forbes et al. | 370/260 |
| 2006/0121925 A1* | 6/2006 | Jung | 455/518 |
| 2006/0149740 A1* | 7/2006 | Tsutazawa et al. | 707/9 |
| 2006/0149811 A1* | 7/2006 | Bennett et al. | 709/203 |
| 2006/0187875 A1* | 8/2006 | Bang | 370/328 |
| 2006/0229094 A1* | 10/2006 | Huh et al. | 455/518 |
| 2007/0070979 A1* | 3/2007 | Kim | H04L 51/38 370/352 |
| 2007/0082689 A1* | 4/2007 | Talty et al. | 455/518 |
| 2007/0155346 A1* | 7/2007 | Mijatovic et al. | 455/90.2 |
| 2007/0298770 A1* | 12/2007 | Lee et al. | 455/412.2 |

OTHER PUBLICATIONS

Open Mobile Alliance: "Interworking of Messaging Services Requirements" Internet Article, [Online] Jul. 26, 2005 (Jul. 26, 2005), pp. 1-36, XP002526392.

Bonnie Chen, Johanna Wild, Motorola: "AD PoC Box" Internet Article, [Online] Dec. 5, 2005 (Dec. 5, 2005), pp. 1-9, XP002526393.

Andrew Allen, Research in Motion, et al.: "NW PoC Box Control and Delivery Using Deferred Messaging Mechanisms" Internet Article, [Online] Feb. 24, 2006 (Feb. 24, 2006), pp. 1-21, XP002526394.

SIPO, "Office Action," issued in connection with Chinese Patent Application No. 200780004393.1, dated Jul. 13, 2011 (14 pages).

SIPO, "Office Action," issued in connection with Chinese Patent Application No. 200780004393.1, dated Apr. 25, 2012 (8 pages).

SIPO, "Office Action," issued in connection with Chinese Patent Application No. 200780004393.1, dated Dec. 4, 2012 (13 pages).

SIPO, "Office Action," issued in connection with Chinese Patent Application No. 200780004393.1, dated May 23, 2013 (7 pages).

EPO, "Extended European Search Report," issued in connection with European Patent Application No. 07701751.5, dated Jun. 25, 2009 (7 pages).

EPO, "Search Report," issued in connection with European Patent Application No. 07701751.5, dated Jan. 27, 2010 (4 pages).

PCT, "International Search Report," issued in connection with PCT Application No. PCT/CA2007/000153, dated May 30, 2007 (2 pages).

PCT, "Written Opinion," issued in connection with PCT Application No. PCT/CA2007/000153, dated May 30, 2007 (6 pages).

PCT, "International Preliminary Report on Patentability," issued in connection with PCT Application No. PCT/CA2007/000153, dated Aug. 5, 2008 (7 pages).

Open Mobile Alliance, "Push to Talk Over Cellular 2 Requirements: Draft Version 2.0-xx.," OMA-RD-PoC-V2_0-20060112-D Jan. 2006 (109 pages).

Canadian Intellectual Property Office, "Notice of Allowance," issued in connection with Canadian Application No. 2,641,051, dated Aug. 7, 2013, 1 page.

State Intellectual Property Office of China, "Notification of Completion of Formalities for Registration" and "Notification of Grant of Invention Patent" issued in connection with corresponding Chinese Patent Application No. 200780004393.1, issued Sep. 11, 2013, and corresponding English translation, 4 pages.

Office Action issued in Canadian Application No. 2,641,051, dated Jul. 20, 2010, 3 pages.

Office Action issued in Canadian Application No. 2,641,051, dated Feb. 21, 2012, 3 pages.

Office Action issued in Chinese Application No. 201310341632.X on Dec. 2, 2015.

First Examination Report issued in connection with Indian Patent Application No. 6699/DELNP/2008, dated Aug. 21, 2014, 2 pages.

3GPP TS 23.140 V6.11.1, "3rd Generation Partnership Project; Technical Specification Group Core Network and Terminals; Multimedia Messaging Service (MMS); Functional description; Stage 2,"Technical Specification, Release 6, Jan. 2006, 220 pages.

* cited by examiner

APPARATUS, AND ASSOCIATED METHOD, FOR NOTIFYING, DELIVERING, AND DELETING MEDIA BURSTS COMMUNICATED IN A PUSH-TO-TALK OVER CELLULAR COMMUNICATION SYSTEM

CROSS REFERENCE TO RELATED APPLICATIONS

The present invention claims the priority of provisional patent application 60/765,097, filed on 3 Feb. 2006, the contents of which are incorporated by reference.

The present invention relates generally to communication of media bursts in a PoC, Push-to-Talk over Cellular, -capable communication system. More particularly, the present invention provides to apparatus and an associated method, by which to facilitate the notification, delivery, performance of operations upon, and deletion of media bursts communicated during operation of the PoC-capable communication system.

A PoC box is provided at which to store media bursts. A transport mechanism is defined and provided by which to communicate the media bursts to and from a PoC box, and manners are defined and provided by which to make disposition of media bursts stored at the PoC box. An efficient mechanism by which to communicate, and make disposition of, a media burst communicated pursuant to operation of a PoC-capable communication system is provided that requires lesser amounts of overhead than conventional mechanisms and does not require a user to have access to a multi-media subsystem, or other SIP-based IP network, to make disposition of the communicated media burst.

BACKGROUND OF THE INVENTION

The use of mobile radio communication systems through which to communicate is pervasive throughout modern society. Cellular, and cellular-like, communication systems, for example, and the networks associated therewith are installed throughout large portions of the populated parts of the world. Such systems are widely utilized, not only for telephonic communications, but also, increasingly, pursuant to data communication services, such as multimedia services.

A user of a cellular, or cellular-like, communication system generally effectuates communications through use of a mobile station. A mobile station is a radio transceiver, and, the radio transceiver includes transceiver circuitry, i.e., a receive part and transmit part, to provide for two-way communication with network infrastructure in whose coverage area that the mobile station is positioned. The network infrastructure of the cellular, or other mobile radio, communication system, i.e., the radio access network, is, in turn, connected to a core network. And, the core network, comprises, or is coupled to, a data network, PSTN (Public-Switched Telephonic Network), or other network to which communication endpoints are connected.

Some cellular, and cellular-like communication systems provide for Push-to-Talk communications, referred to as PoC (Push-to-Talk over Cellular) systems. PoC-capable systems, and mobile stations operable in such systems, provide for various communication advantages including reduced communication delays between PoC-capable communication stations.

Push-to-Talk operation is created, e.g., through the maintenance of a connection between communication stations that form the communication devices operable pursuant to a PoC communication session. While use of PoC systems by which to communicate voice data is widespread, increasingly, attention is directed towards the use of a PoC system by which to communicate generic media. Proposals are under consideration by the Open Mobile Alliance (OMA) pursuant to drafting sessions that pertain to various aspects of PoC communications.

Proposals have been set forth, for instance, that pertain to a PoC box function. A PoC box forms, for instance, a server at a network that receives and stores media bursts transmitted to the network by a PoC client, i.e., a Push-to-Talk over Cellular, PoC, terminal. The media bursts are transmitted using a session-based media transfer protocol, such as RTP (Real-Time Transport Protocol) used by a PoC service. The PoC box receives such transmitted media bursts in a similar way to a PoC client. A media burst is formed of, or otherwise includes, speech, audio, video, pictures, other media content, or any various combinations of such media types.

To date, however, a manner has not been set forth that defines mechanisms or procedures by which to control the PoC box. No manner, for instance, to date, has been provided to define in what manner to delete a stored message, or to receive, or provide, notification of a stored message.

Existing proposals relating to a PoC box functionality generally do not provide procedures in half-duplex, Push-to-Talk communications that readily allow for a requestor to enable another party to deliver media upon the request of an initiator. Also, in delivering a media burst to a terminal using RTP protocol, use of radio resources is relatively inefficient. Once the message is stored, real-time delivery is no longer required, and the additional overhead associated with the RTP protocol is not required. Additionally, the media bursts cannot be delivered when the user does not have access to an IP Multimedia Subsystem (IMS) or another SIP (Session Initiation Protocol)-based IP network or the PoC service that is one of the main scenarios when media bursts are likely to be stored in a PoC box.

In short, many procedures, mechanisms, and protocols associated with a PoC box functionality remain to be defined.

It is in light of this background information related to PoC communication systems that the significant improvements of the present invention have evolved.

DETAILED DESCRIPTION

Figure 1:
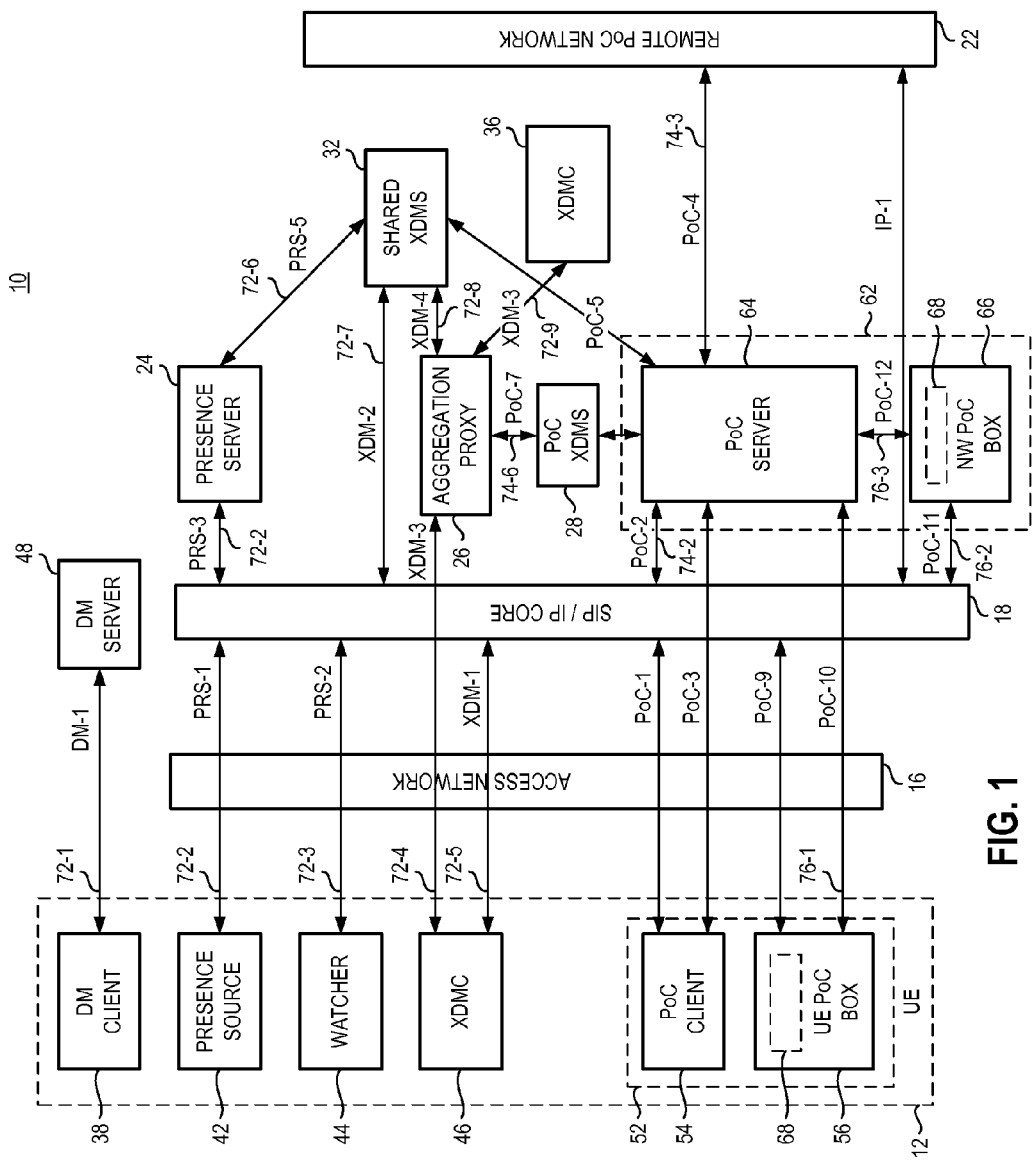
FIG. 1 illustrates a functional block diagram of a radio communication system in which an embodiment of the present invention is embodied.

The present invention, accordingly, advantageously provides, apparatus, and an associated method by which to facilitate communication of a media burst in a PoC communication system.

Through operation of an embodiment of the present invention, a manner is provided by which to facilitate the notification, delivery, and disposition of a media burst communicated pursuant to operation of a PoC-capable communication system.

In one aspect of the present invention, a transport mechanism is defined and provided, for the communication of a media burst to, and with, a PoC box function. The transport mechanism provides an efficient manner by which to transport the media burst to, or from, the PoC box, and to make disposition, such as deletion of, a stored media burst at the PoC box. A mechanism is provided by which to make, or receive, notification of a stored media burst.

In another aspect of the present invention, a PoC box is provided at a mobile station, i.e., user equipment (UE). The PoC box, forming a UE PoC box, forms a store, or buffer, at which a media burst, communicated to the user equipment is stored. Once stored at the PoC box, a mechanism is provided by which to make notification of the delivery to, and buffering at, the UE PoC box. A further mechanism is provided by which to make further disposition of the buffered media burst.

In another aspect of the present invention, the PoC media burst is transported as an email message containing an identifier that identifies the email message to contain the Push-to-Talk media burst. The email message includes, e.g., an address that includes a "from" header. The address that populates the "from" header is obtained from a signaling message, such as an SIP (Session Initiation Protocol) message used pursuant to Push-to-Talk signaling. Or, the address populating the "from" header is obtained from a talk burst or media burst control message that is delivered to the user equipment using RTCP (Real Time Control Protocol) or another protocol used for talk bursts, or media burst, control pursuant to Push-to-Talk operation. Or, the address populating the "from" header is obtained from a delivered, multimedia message, or email, that is used to initiate a Push-to-Talk session.

In another aspect of the present invention, a PoC box function is provided at the network part of the communication system. The PoC box is embodied, e.g., at a server at a network location to which media bursts transmitted, e.g., by a PoC client is routable. A user is able to interact with the network-based PoC box by way of a fixed terminal. The network PoC box is also configurable to be accessible by a user from a mobile terminal, i.e., a user equipment. Wheresoever positioned, i.e., at a user equipment or at a network, a mechanism is provided by which to control the PoC box and the contents stored thereat. A mechanism is provided, e.g., by which to control deletion of stored contents as well as to receive notifications of the stored contents.

In another aspect of the present invention, the PoC box, wheresoever positioned, is implemented utilizing a technology platform similar to that used pursuant to an MMS (Multimedia Messaging Service) message store. The MMS includes protocol procedures that are defined to view, to delete, to notify, and to deliver stored multimedia messages. A stored media burst, received, e.g., utilizing an RTP, or other session-based, media-transfer protocol used by the PoC service, is converted and stored as a multimedia message. The user is notified and informed of the identification of the stored media burst using an MMS protocol. For instance, an MM1_MMbox_view.req and MM1_MMbox_view.resp messages are used. A user downloads a stored, PoC media burst, stored at the PoC box, as a multimedia message. The multimedia message formed, e.g., an MM1_retrieve.req and MM1_retrieve.resp messages. And, deletion of the media burst out of the PoC box is effectuated using an MMS message, e.g., the MM1_MMbox_delete.req message.

Through the use of MMS messages, their communication and delivery is able to be carried out even when the user does not have access to an IP Multimedia Subsystem (IMS) or another SIP-based, IP network, or even the PoC service. The MMS works on CS and GPRS networks, thereby providing such messaging capability.

In these and other aspects, therefore, apparatus, and an associated method, is provided for a communication station operable pursuant to a PoC, Push-to-Talk over Cellular, communication scheme. A PoC box is configured to store a PoC media burst. A controller is configured to control a storage indicia associated with the PoC media burst received at the PoC box.

Referring first, therefore, to FIG. 1, a communication system, shown generally at 10, provides for radio communication with user equipment, of which the User Equipment (UE) 12 is representative. Communications are effectuated by way of a radio air interface with a radio access network 16. In the exemplary implementation, the radio communication system operates in general conformity with protocols and procedures set forth in an Open Mobile Alliance (OMA) pertaining to a new-generation mobile radio communication system. More generally, the communication system 10 is representative of any of various communication systems capable of communicating data in the form of media bursts.

The access network 16, is, in turn, coupled to a core network 18, here an SIP/IP (Session Initiation Protocol/Internet Protocol) network core. And, the core network 18 is further coupled to other networks, of which the network 22 is representative. Here, both the access network 16 and the remote network 22 comprise PoC-capable (Push-to-Talk over Cellular-capable) networks.

Various functional entities are positioned in communication connectivity with the network parts and/or the user equipment of the communication system. Here, a presence server 24, an aggregation proxy 26, a PoCXDMS 28, a shared XDMS 32, and an XDMC 36 are variously coupled, directly or indirectly, with the network infrastructure and the user equipment 12. And, the user equipment also includes various functional entities, here shown to include a DM client 38, a presence source 42, and an XDMC 46. The DM client 38 is placed in communication connectivity with a network-based DM server 48.

Pursuant to an embodiment of the present invention, the user equipment further includes apparatus 52 of an embodiment of the present invention. The apparatus includes a PoC client 54 and a UE PoC box 56. And, the network includes further apparatus 62 of an embodiment of the present invention. The apparatus 62 includes a PoC server 64, and a NW (Network) PoC box 66. The PoC boxes 56 and 66 form stores, or caches of content, i.e., media, communicated during operation of the communication system. Pursuant to operation of an embodiment of the present invention, a mechanism is provided by which to communicate the media as well as, also, to make disposition of the media delivered to, and stored at, a PoC box 56 or 66. Control functions 68, here shown together with the respective PoC boxes 56 and 66 provide for the transport and disposition of the media burst content. The controller functions are formed at any appropriate location, or functional entity, positionable in communication connectivity to control the media bursts generated utilized, and stored pursuant to an embodiment of the present invention.

The UE PoC box 56 forms a function that is co-located together with the PoC client 54 at the user equipment at which PoC session data and PoC session control data is stored. The PoC box also provides functionality permitting replay of recorded PoC session data to one or more participants in a PoC session.

The network PoC box operates analogously. That is to say, the network PoC box provides for the storage of PoC session data and PoC session control data. The session data includes, e.g., media bursts and media burst control information exchanged during a PoC session, such as video frames, an image, or a burst of voice data. And, the session control data includes, e.g., information regarding PoC session data, such as time and date, PoC session initiator information, etc.

Various lines 72 represent signaling lines between the various functional entities shown in FIG. 1. Signaling between the DM client and server is represented by the line 72-1. Signaling between the presence source 42 and the presence server 24 is represented by the lines 72-2. Signaling between the watcher 44 and the network 418 is represented by the line 72-3. Signaling between the XDMC 46 and the aggregation proxy 26 is represented by the line 72-4. Signaling between the XDMC and the network core is represented by the line 72-5. Signaling between the presence server 24 and the shared XDMS 32 is represented by the line 72-6. Signaling between the core network 18 and the shared XDMS function is represented by the line 72-7. And, signaling between the aggregation proxy 26 and the shared XDMS function 32 is represented by the line 72-8. And, signaling between the aggregation proxy and the XDMC function is represented by the line 72-9. Signaling details associated with the line 72-1 through 72-9 are found in an inappropriate specification standard part promulgated by the open mobile alliance.

FIG. 1 further illustrates signaling lines extending between various of the functional entities shown in FIG. 1 that are related to the PoC functionality of the communication system. Session signaling carried out between the PoC client and the network core is represented by the line 74-1. And, session signaling carried out between the client, the network core 18, and the PoC server 64 is represented by the line 74-2. SIP signaling is utilized pursuant to the session signaling. Media and talk burst control is also represented by the line 74-2. RTP and RTCP are utilized pursuant to such burst control. For instance, the media transport utilizes RTP protocol, and talk burst control protocol utilizes RTCP APP message protocol. The access network used by the PoC architecture includes both the radio access as well as other nodes required to gain IP connectivity and IP mobility. The line 74-3 represents signaling for media and talk burst control, also carried out using RTP and RTCP. The media transport utilizes RTP protocol. Talk burst control protocol utilizes RTCP APP message protocol. Lines 74-4-5, 74-6, 74-7, and 74-8 represent other signaling, carried out variously by way of XCAP and SIP protocols.

Further pursuant to an embodiment of the present invention, signaling between the PoC box 56 and the PoC server 64, represented by way of the line 76-1, is defined. Media and talk burst control is carried out using RTP and RTCP. The media transport utilizes RTP protocol. And, talk burst control protocol/media burst control protocol utilizes RTCP APP message protocol. The access network 16 used by the PoC architecture includes both the radio access as well other nodes required to gain IP connectivity and IP mobility.

The line 76-2 represents signaling between the core network and the PoC box 66, carried out using SIP protocol. And, signaling carried out between the PoC box 66 and server 64 is represented by the line 76-3. Again, RTP and RTCP signaling is utilized. The media transport utilizes RTP protocol. Talk burst control protocol/media control protocol utilizes RTCP APP message protocol. The access network used by the PoC architecture set forth in FIG. 1 includes both the radio access as well as the other nodes required to gain IP connectivity and IP mobility.

Pursuant to an embodiment of the present invention, the PoC box 56 embodied at the user equipment 12, together with the control function 68 embodied thereat, supports PoC session signaling media burst control procedures, talk burst control procedures, storage of session data, and storage of session control data. Additionally, in the exemplary implementation, additional functionality is provided to support retrieval of PoC session data, support retrieval of media control data, support the management of stored PoC session control data and stored PoC session data, and to delete the stored PoC session control data and the PoC session data when a life time expires.

Additionally pursuant to an embodiment of the present invention, the PoC box 66 embodied at the network, and a control functionality associated therewith, supports PoC session signaling, media burst control procedures, talk burst control procedures, storage of PoC session data, and storage of PoC session control data. Additionally, in the exemplary implementation, the functionality further supports retrieval of PoC session data, retrieval of media control data, management of stored PoC session control data and stored PoC session data, and the deletion of stored PoC session control data and session data when a life time expires.

Through such signaling connections and defined transport mechanisms, functionality is provided by which to make notification of, delivery of, and deletion of stored media bursts. A media burst is communicated to selected PoC box as a multimedia message or an email message containing a mechanism by which to identify the message as a Push-to-Talk media burst. In one implementation, when the media burst is communicated as an email message, the information populating the "from" header is obtained from an SIP signaling message used for the signaling or from a talk burst or media burst control message delivered using RTCP or another transport protocol used for talk burst or media burst control for Push-to-Talk operation.

Figure 2:
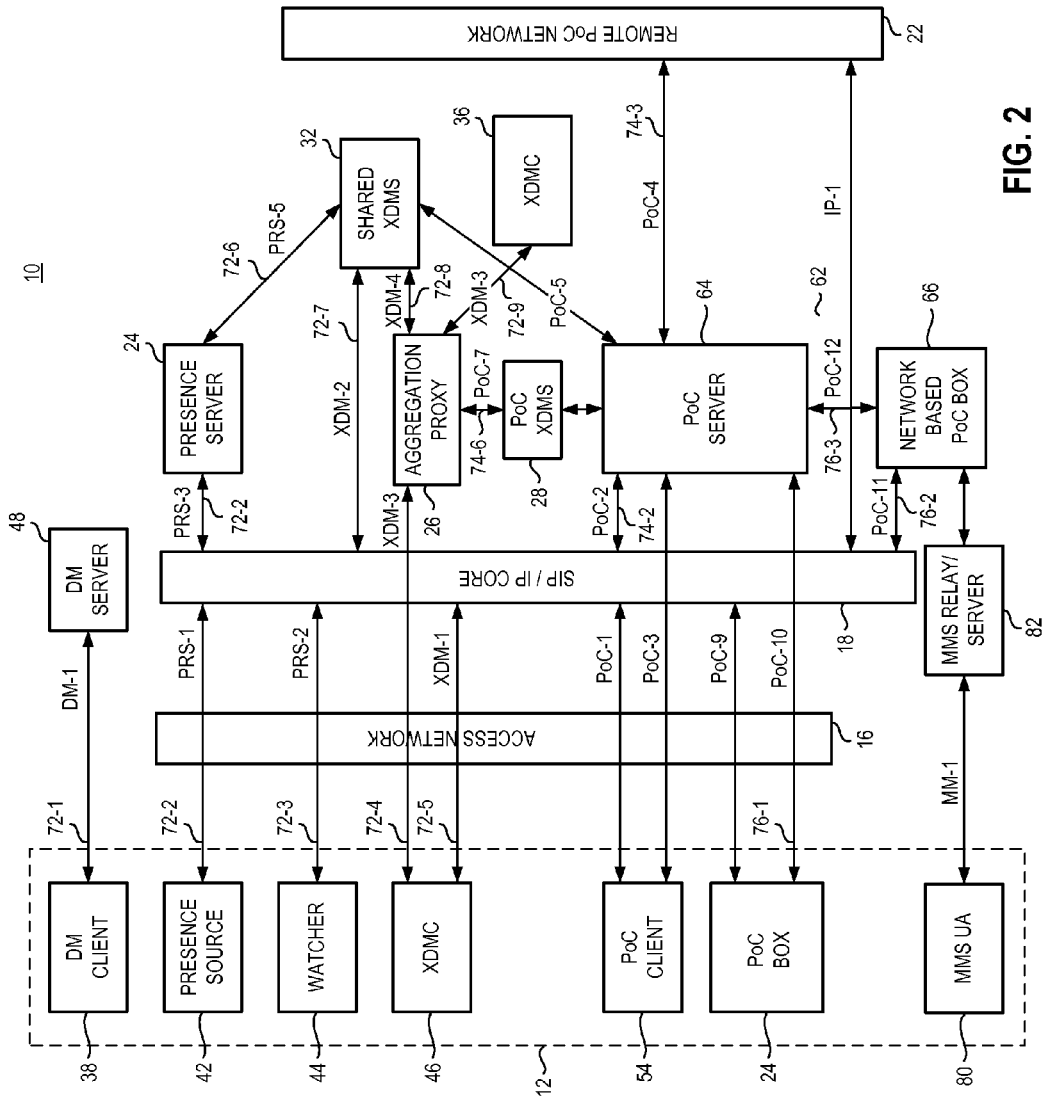
FIGS. 2 and 3 illustrate representations of the logical architecture of an exemplary PoC communication system.

FIG. 2 is similar to the FIG. 1 and here includes entities 80 and 82. By the addition of the entities 80 and 82, talk bursts are deliverable to a user or notification can be made to a user or notification can be made to a user of the presence of the talk bursts. The talk bursts are identified as such, or otherwise identified to be data other than just ordinary message.

Figure 3:
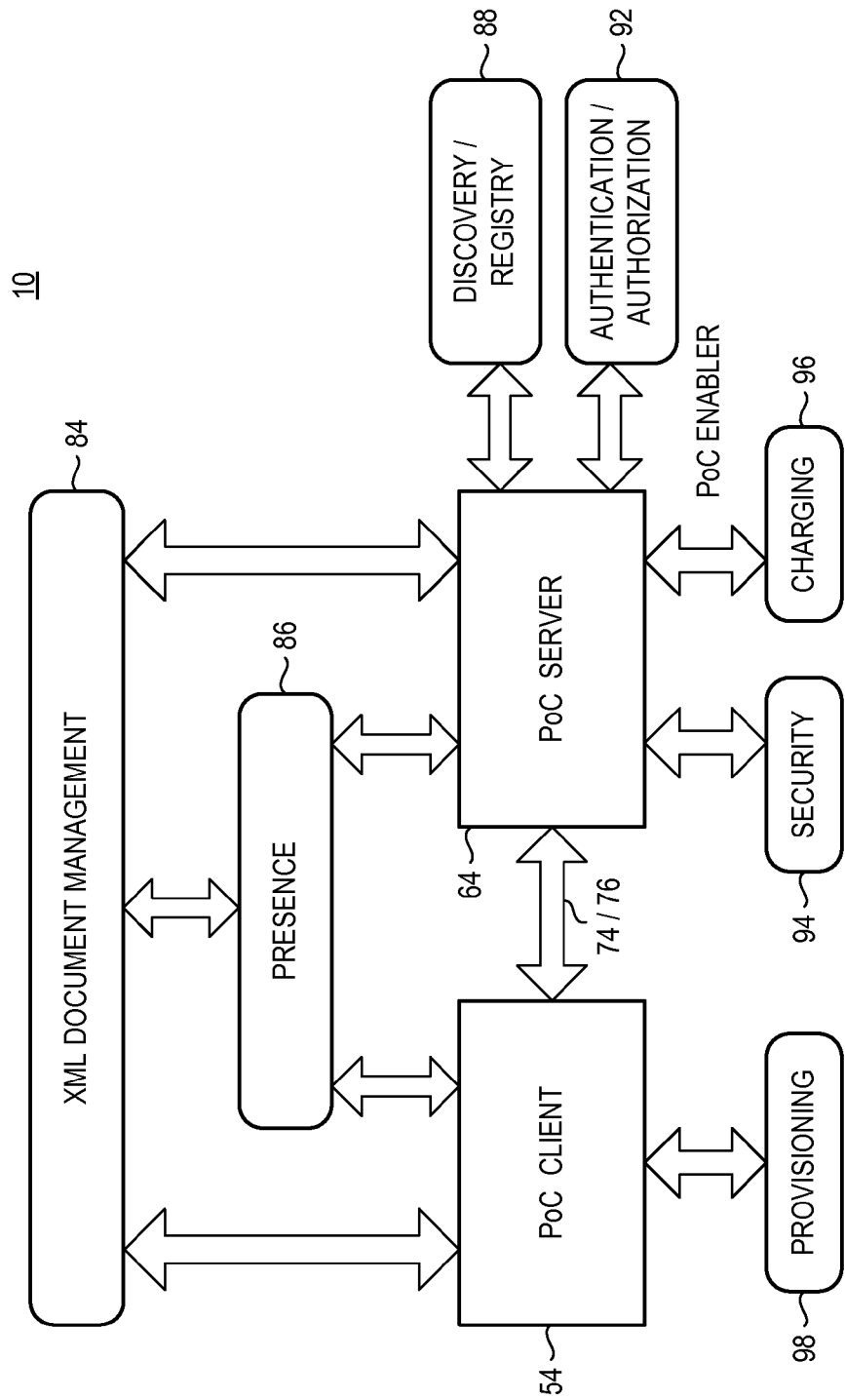

Turning next to FIG. 3, the logical architecture of parts of the communication system 10 is shown. Here, the PoC client 54 and the PoC server of the user equipment and network infrastructure, respectively, are shown together with signaling paths 74 and 76 that extend therebetween. Additionally, XML document management functionality 84 and presence functionality 86 extending between the client and the server are also illustrated.

The XML document management functionality is described in an appropriate OMA specification standard promulgation. And, the presence service functionality and enabler is also described in an appropriate specification standard promulgation of the OMA. Discovery and registry functionality, indicated by the block 88, is provided to the PoC server, authentication and authorization, indicated by the block 92 is further provided to the server. Security and charging functionality indicated by the blocks 94 and 96 are provided to the server 64. And, provisioning functionality indicated by the block 98 is provided to the PoC client 54.

Figure 4:
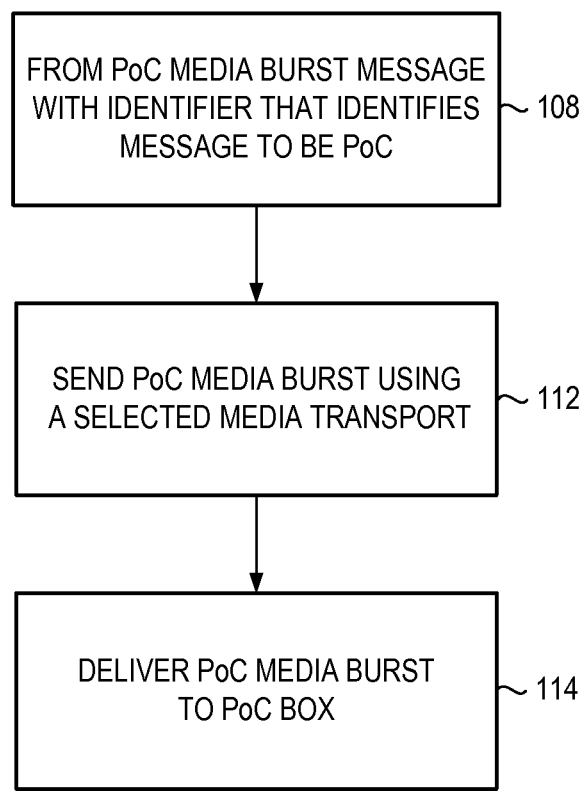
FIG. 4 illustrates a method flow diagram representative of the method of operation of an embodiment of the present invention.

FIG. 4 illustrates a method flow diagram, shown generally at 106, representative of an embodiment of the present invention. The method facilitates communication of a PoC media burst.

First, and as indicated by the block 108, a PoC media burst message having a PoC media burst is formed. Then, and as indicated by the block 112, the PoC media burst is sent utilizing a selected media transport. And, as indicated by the block 114; the PoC media burst is delivered to a PoC box. Then, and as indicated by the block 112, disposition of the media burst is controlled. Disposition includes, for instance, notification to a user of the communication of the media burst, sending of the media burst, and deletion of the media burst, such as when the media burst no longer is required.

Thereby, through operation of an embodiment of the present invention, a transport mechanism by which to transport a PoC media burst is defined, and control is provided by which to make disposition of a media burst such as to delete the media burst when no longer needed at the PoC box.

What is claimed is:

1. A user equipment (UE) operable pursuant to a Push to talk Over Cellular (PoC) communication scheme, said UE comprising:
   a client configured to receive, over a wireless access network, a PoC media burst from a PoC session, the PoC media burst being received in a multimedia message of a multimedia messaging service (MMS), the received multimedia message also including an identifier to identify the multimedia message as including PoC media burst data from the PoC session, and a copy of the PoC media burst and corresponding control data of the PoC session being stored at a network element;
   a controller configured to:
      provide an indication at the UE that indicates that the received multimedia message includes PoC media burst data from the PoC session; and
      provide a capability at the UE for transmitting a control message of the MMS to the network element, the control message instructing the network element to delete the stored copy of the PoC media burst and the corresponding control data of the PoC session.

2. The UE of claim 1 wherein said client is further configured to store the PoC media burst received over the wireless access network.

3. The UE of claim 1 wherein the controller is further configured to provide an indication to a user of reception of the PoC media burst at the UE.

4. A method for facilitating communication of a push-to-talk Over Cellular (PoC) media burst, said method comprising:
   receiving, over a wireless access network at a user equipment (UE), the PoC media burst from a PoC session, the PoC media burst being received in a multimedia message of a multimedia messaging service (MMS), the received multimedia message also including an identifier to identify the multimedia message as including PoC media burst data from the PoC session, and a copy of the PoC media burst and corresponding control data of the PoC session being stored at a network element;
   storing the received PoC media burst;
   providing an indication at the UE that indicates that the received multimedia message includes PoC media burst data from the PoC session; and
   providing a capability at the UE for transmitting a control message of the MMS to the network element, the control message instructing the network element to delete the stored copy of the PoC media burst and the corresponding control data of the PoC session.

5. The method of claim 4 further comprising: supporting PoC session signaling associated with the PoC session in which the PoC media burst is communicated.

6. The method of claim 4 further comprising: supporting Media Burst Control procedures associated with communication of the PoC media burst.

7. The method of claim 4 further comprising: supporting Talk Burst Control procedures associated with communication of the PoC media burst.

8. A method of communicating media in a Push-to-Talk over Cellular (PoC) communication system, said method comprising:
   forming, at a network element, a multimedia message of a multimedia messaging service (MMS), the multimedia message including a PoC media burst from a PoC session and an identifier identifying that the multimedia message includes PoC media burst data from the PoC session;
   storing a copy of the PoC media burst and corresponding control data of the PoC session;
   sending the multimedia message including the PoC media burst and the identifier over a wireless network to a user equipment (UE); and
   providing for deletion of the copy of the PoC media burst and the corresponding control data of the PoC session stored at the network element in response to receiving a control message of the MMS over the wireless network from the UE.

9. The method of claim 8 wherein said sending the multimedia message further comprises:
   extracting a delivery address out of a Session Initiation Protocol (SIP) message, and
   populating a destination address field of the multimedia message with the delivery address.

* * * * *